(12) United States Patent
Felsl et al.

(10) Patent No.: US 8,950,771 B2
(45) Date of Patent: Feb. 10, 2015

(54) BICYCLE FRAME HAVING A HEIGHT-ADJUSTABLE SADDLE PILLAR

(75) Inventors: Andreas Felsl, Biel/Bienne (CH); Jorg Poppe, Rosenheim (DE); Dirk Lude, Bad Wiessee (DE)

(73) Assignee: B-Labs AG, Biel (CH)

( * ) Notice: Subject to any disclaimer, the term of this patent is extended or adjusted under 35 U.S.C. 154(b) by 0 days.

(21) Appl. No.: 13/702,281

(22) PCT Filed: May 31, 2011

(86) PCT No.: PCT/EP2011/058969
§ 371 (c)(1),
(2), (4) Date: Mar. 18, 2013

(87) PCT Pub. No.: WO2011/151336
PCT Pub. Date: Dec. 8, 2011

(65) Prior Publication Data
US 2013/0187359 A1    Jul. 25, 2013

(30) Foreign Application Priority Data
Jun. 5, 2010   (DE) .................... 20 2010 007 638 U

(51) Int. Cl.
*B62K 1/00* (2006.01)
*B62K 19/36* (2006.01)
*B62J 1/08* (2006.01)

(52) U.S. Cl.
CPC ... *B62K 19/36* (2013.01); *B62J 1/08* (2013.01)
USPC .................................................... 280/281.1

(58) Field of Classification Search
USPC .............. 280/281.1, 124, 220, 274, 275, 278, 280/287, 288.4; 248/407, 408; 297/215.13, 297/215.14, 344.18, 344.19
See application file for complete search history.

(56) References Cited

U.S. PATENT DOCUMENTS

| 4,834,413 A | * | 5/1989 | Patel et al. ................. 280/304.1 |
| 6,354,557 B1 | * | 3/2002 | Walsh ............................ 248/600 |
| 6,435,112 B1 | * | 8/2002 | Insalaco .................... 108/147.21 |
| 6,478,278 B1 | | 11/2002 | Duncan |
| 7,422,224 B2 | * | 9/2008 | Sicz et al. ..................... 280/274 |

(Continued)

FOREIGN PATENT DOCUMENTS

DE    20 2007 014 515    2/2008
DE    10 2009 010 170    8/2010

(Continued)

OTHER PUBLICATIONS

EP Search Report from corresponding EP application, dated Oct. 7, 2014.

*Primary Examiner* — Joseph M Rocca
*Assistant Examiner* — Felicia L Brittman
(74) *Attorney, Agent, or Firm* — Boyle Fredrickson S.C.

(57) ABSTRACT

What is disclosed is a bicycle frame (1) comprising a seat tube (4) in which a saddle pillar (2) for a saddle is at least partially held, wherein the saddle pillar (2) or the main tube (12) thereof is adapted for translatory movement and height-adjustment relative to the bicycle frame (1). In this case, a rotation prevention device and a locking device, in particular a seat device, are fastened on the seat tube (4). Both securing devices act between the seat tube (4) and the main tube (12) in a form-fitting manner. In this case, the device for securing against rotation engages permanently in the main tube and the latching device can engage in, and can be disengaged from, the main tube.

16 Claims, 3 Drawing Sheets

(56) References Cited

U.S. PATENT DOCUMENTS

| | | | |
|---|---|---|---|
| 8,414,070 B2 * | 4/2013 | Hsieh .................. | 297/215.13 |
| 2004/0208687 A1 | 10/2004 | Sicz et al. | |
| 2007/0132203 A1 | 6/2007 | Yamakoshi | |

FOREIGN PATENT DOCUMENTS

| | | |
|---|---|---|
| FR | 2 758 305 | 7/1998 |
| NL | 7612962 | 5/1978 |
| WO | 2006/039195 | 4/2006 |

* cited by examiner

BICYCLE FRAME HAVING A HEIGHT-ADJUSTABLE SADDLE PILLAR

BACKGROUND OF THE INVENTION

1. Field of the Invention

The invention relates to a bicycle frame having a height-adjustable saddle pillar according to the claims and a method for its assembly.

2. Description of the Related Art

Various approaches are known for bicycle frames having a height-adjustable saddle pillar.

In simple solutions, a saddle tube having a saddle fastened thereon is clamped in a seat tube of a bicycle frame. For adjustment, the clamp may be released, the saddle and the saddle tube both adjusted in height, and the clamp may be then re-engaged.

There are furthermore known solutions where a saddle pillar having an adjustable length is clamped in the seat tube of the bicycle frame.

A saddle pillar suited in this regard is known, e.g., from DE 20 2007 014 515 U1 or WO 2006/039195 A2. These documents disclose saddle pillars where the saddle is fastened on a telescope-type pipe arrangement having a frame-side outer tube and a saddle-side inner tube guided in the outer tube. The inner tube is in operative connection with a separating piston separating two pressure chambers from each other. In the case of the known solutions, these two pressure chambers are filled with a non-compressible medium such as oil, for example. In order to adjust the length of the saddle pillar, a valve arranged in the separating piston may be adjusted in a direction from the saddle by means of an adjusting lever so as to open a pressure medium connection between the two above-mentioned pressure chambers. The separating piston arrangement and thus the inner tube is subjected to the pressure in one of the pressure chambers—termed the positive chamber—in the extending direction and to the pressure in the other pressure chamber—termed the negative chamber—in the lowering direction. Here the effective surfaces of the separating piston arrangement are configured such that the force component acting upwardly in the extending direction is greater than the force component acting in the retracting direction, so that the inner tube is biased in the extending direction.

While the pressure medium connection is open, the inner tube may then be pushed into the outer tube by the rider's weight in order to change the saddle height, for example when going downhill, with pressure medium being displaced from the pressure chamber being diminished in size via the opened pressure medium connection into the pressure chamber being enlarged in size. Fixing the saddle pillar in a predetermined relative position is effected by closing the pressure medium connection, so that the exchange of pressure medium between the two pressure chambers filled with a non-compressible medium is then inhibited. In the known solutions, a kind of air spring which is formed by the volumes of air formed in the inner tube and/or in the outer tube is furthermore associated to the pressure chambers.

On the one hand it is a drawback of these known solutions including two pressure media (air, oil) that they have a very complicated construction inasmuch as a multiplicity of pressure chambers must be formed and selected in accordance with the axial length and the diameter of the saddle pillar. Moreover considerable expenditure for sealing is required in order to separate the two pressure media from each other.

Another length-adjustable saddle pillar is shown in document DE 10 2009 010 170 A1. It has an outer tube and an inner tube displaceable in the latter, wherein a separating piston delimiting a positive chamber and a negative chamber is arranged between the outer and inner tubes. A pressure medium connection between the positive chamber and the negative chamber may be closed by means of a closure member. This closure member may be an elastomer ring and may be configured such as to connect inner tube and outer tube with each other by frictional connection or form-fit in the closed position, i.e., while the pressure medium connection is blocked.

It is a drawback of such bicycle frames including an adjustable saddle pillar that in addition to the seat tube of the frame an outer tube of the saddle pillar received therein and an inner tube of the saddle pillar in turn received in the former are necessary. This amounts to a considerable weight and a small adjustment range of the frame including an adjustable saddle pillar.

SUMMARY OF THE INVENTION

In contrast, the invention is based on the object of providing a bicycle frame comprising a saddle pillar which is adjustable during running, wherein a rotation of the saddle pillar is prevented and the weight thereof is reduced.

This object is achieved through a bicycle frame comprising an adjustable saddle pillar which has the features of one or more of the claims and through a method for mounting such a bicycle frame which has the features of one or more of others of the claims.

The bicycle frame in accordance with the invention comprises a seat tube wherein a main tube of a saddle pillar may be inserted by at least portions thereof, the main tube being adapted for translatory movement and height-adjustment relative to the seat tube. A rotation prevention means and a locking device, in particular supporting device, are fastened on the seat tube. Both securing means act through form-fit between the seat tube and the main tube, with the engagement of the rotation prevention means in the main tube being permanent and the engagement of the locking device in the main tube being switchable. Hereby a bicycle frame comprising a saddle pillar which is adjustable during running is furnished, with a rotation of the saddle pillar being prevented even during the height adjustment. The number of tubes is hereby reduced in comparison with the prior art, and the weight of the bicycle frame comprising the saddle pillar is hereby reduced.

Further advantageous aspects of the invention are described in the appended claims.

For the purpose of holding or supporting the saddle pillar in at least two different adjustment positions (e.g., uphill and downhill positions) it is preferred if the locking device comprises a fixation pin which is arranged to be movable substantially transversely to an adjusting direction, and if the main tube comprises at least two radial recesses spaced apart from each other along its longitudinal axis in which the fixation pin may lockingly engage.

It is also possible to provide distinctly more than two radial recesses at the main tube. Hereby the fineness of gradation and/or the adjustment range of the height adjustment is enhanced.

Preferred radial recesses at the main tube are radial penetrating recesses.

In a preferred manner, the fixation pin may be acted on by a locking force of an elastic locking member—in particular a compression spring—in the direction toward the respective radial recess, and may be moved contrary to this force via a remote control by a handlebar of the bicycle frame.

In a preferred manner, the fixation pin may be moved via a rotary device and/or via a pulling device and via a Bowden cable from an operating element of the handlebar, in particular out of the respective radial recess. Thus, a rider of the bicycle may in a quick and simple manner release the locking engagement and perform the height adjustment.

The rotation prevention means may comprise a depression or groove in the main tube which is directed radially inward and in which at least one sliding block integral with the frame is inserted radially from the outside. The depression or groove may have been formed by the hydroforming process and should at least have a length corresponding to the adjustment height.

In a preferred embodiment of the invention the rotation prevention means and the locking device are combined in one structural unit as a fixation device.

Here it is preferred if the fixation pin is held in the fixation device and if the remote control has the rotary device for the fixation pin which is coupled to the fixation pin and arranged at the seat tube and which is adapted to be moved by the operating element of the handlebar via the Bowden cable. Hereby the fixation pin is rotated and moved substantially transversely to the adjusting direction owing to a helical groove. Clamping of the fixation pin in the radial recess is hereby avoided.

It is particularly space-saving if the fixation device is substantially received in the saddle pillar, particularly in a main tube of the saddle pillar. Hereby the fixation device is also protected mechanically against external influences.

In a preferred practical example, the rotation prevention means comprises a feather key which is inserted in an oblong hole of the saddle pillar, particularly in an oblong hole of its main tube. Here a length of the oblong hole should at least correspond to a length of the adjustment range.

In a preferred development of the frame in accordance with the invention comprising a saddle pillar, it comprises a tube which is integral with the saddle and inserted in the upper end portion of the main tube so as to be slidingly displaceable and thus height-adjustable and may be fastened thereon by clamping. Thus it is possible to adapt the basic setting and/or the adjustment range of the height to persons of various height sitting on the saddle, so that persons of different height may equally make use of the adjustment range between the at least two radial recesses.

In order to allow the saddle pillar to also be adjusted upward in a quick and simple manner, it is preferred if an elastic member is supported on or fastened to the rotation prevention means or the fixation device and applies a lifting force to the saddle pillar or the main tube thereof. It is thus possible to reduce the saddle height by releasing the fixation device and by applying a load on the saddle pillar or the main tube thereof. This is important, for instance, when going downhill or in the case of less athletic riders prior to dismounting. It is possible to increase the saddle height by releasing the fixation device and reducing the load on the saddle pillar or the main tube thereof. This is important, e.g., when going uphill or in the case of less athletic riders following mounting and after having reached stable straight running.

A preferred development of the elastic member is a tension spring or a rubber band arranged inside the saddle pillar and in particular inside the main tube thereof.

Here it is preferred if the tension spring or the rubber band is braced and hooked between the fixation device or the rotation prevention means and the saddle pillar, in particular the main tube thereof.

The elastic member may extend from the fixation device or the rotation prevention means to a lower end portion of the main tube. Or, the elastic member extends upward, wherein there is fastened at its upper end portion a bendable tension means which is guided downward via a deflection means, in particular a deflection roller, and fastened to the main tube below the deflection means.

Another preferred development of the elastic member is an air spring which is arranged inside the saddle pillar, particularly inside the main tube thereof. The air spring comprises an outer tube and an inner tube which partially overlap each other and jointly delimit a pressure chamber, wherein the inner tube is fastened to the fixation device while the outer tube is directly or indirectly fastened to the saddle pillar.

If the air spring includes a blocking valve (e.g., car tire valve) for changing the pressure in the pressure chamber, the lifting force may be adapted to the weight of persons of different weight sitting on the saddle.

By means of an annular sealing cap which is attached to an upper end portion of the seat tube and comprises a seal and/or slide bearing resting against the saddle pillar, particularly the main tube thereof, manufacturing tolerances of the frame may be compensated.

As a lower sliding guide it is preferred if at least one slide bearing, particularly one fastened to the fixation device, is arranged between the fixation device and the main tube.

In a preferred arrangement of the components of the invention, the rotary device of the remote control, the feather key, and the oblong hole are arranged in front at the fixation device relative to the running direction of the bicycle frame. In the rear relative to the running direction the fixation pin of the fixation device and the at least two radial recesses of the main tube are arranged. The coupling point for the Bowden cable is thus arranged on the handlebar side of the rotary device and easily accessible.

The method of the invention for mounting a bicycle frame includes the steps of:
  inserting a fixation device in a main tube of a saddle pillar;
  producing a recess at the seat tube of the bicycle frame;
  inserting the main tube in the seat tube;
  fastening, in particular welding a base plate from the outside on or in the recess at the seat tube; and
  screw-fastening the base plate and, or with, the fixation device.

Thus the frame in accordance with the invention comprising a saddle pillar may be manufactured with low complexity from a standard bicycle frame, or the saddle pillar may simply be retrofitted on a standard bicycle frame.

In the following a practical example of the invention will be described in detail while making reference to the figures of the drawings, wherein:

DETAILED DESCRIPTION OF THE DRAWINGS

Figure 1:
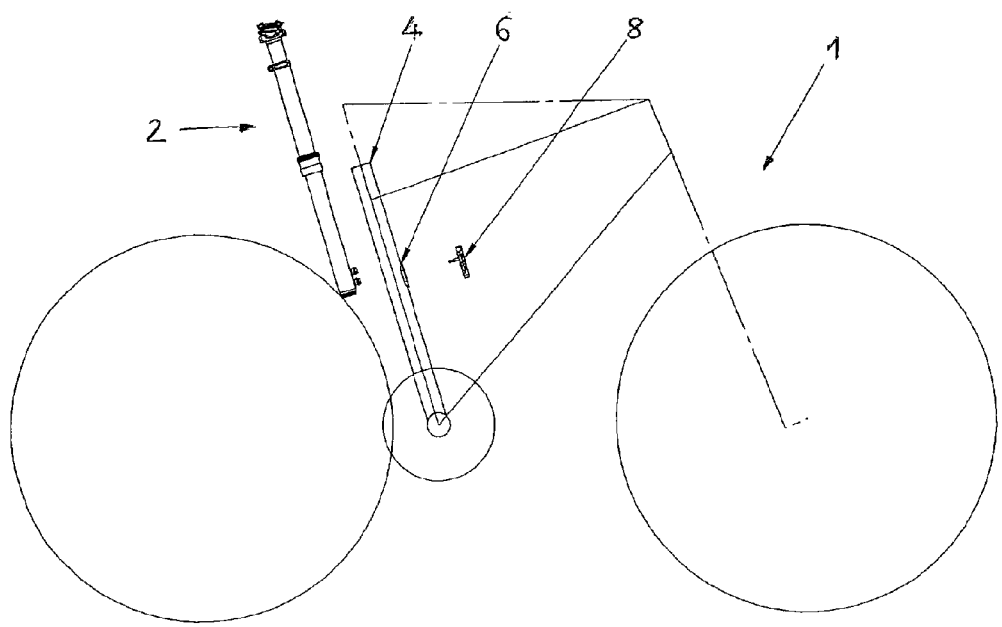
FIG. 1 shows the practical example of the bicycle frame in accordance with the invention comprising a height-adjustable saddle pillar in a lateral schematic view.
Figure 4:
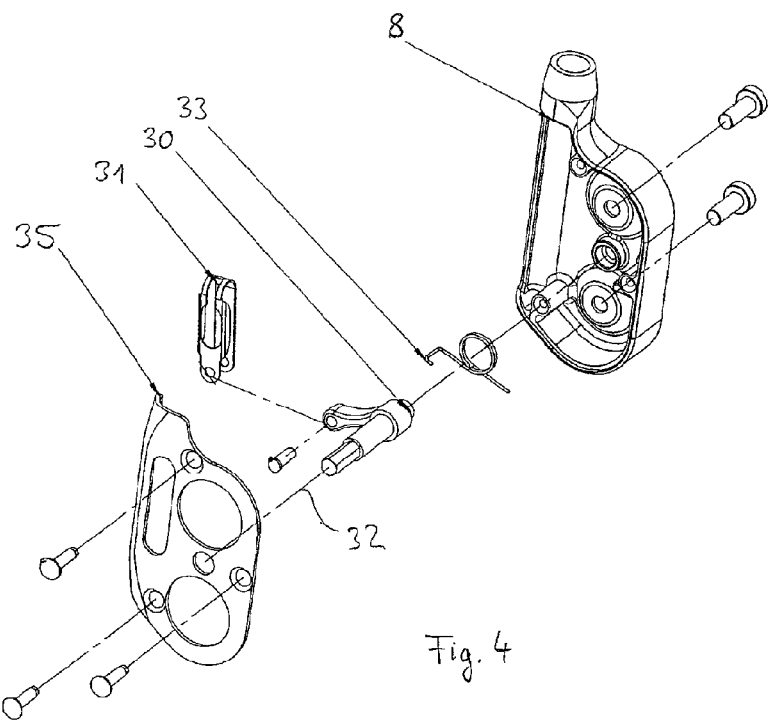
FIG. 4 shows a rotary device and a housing of the practical example in a drawn-apart representation.
Figure 2:
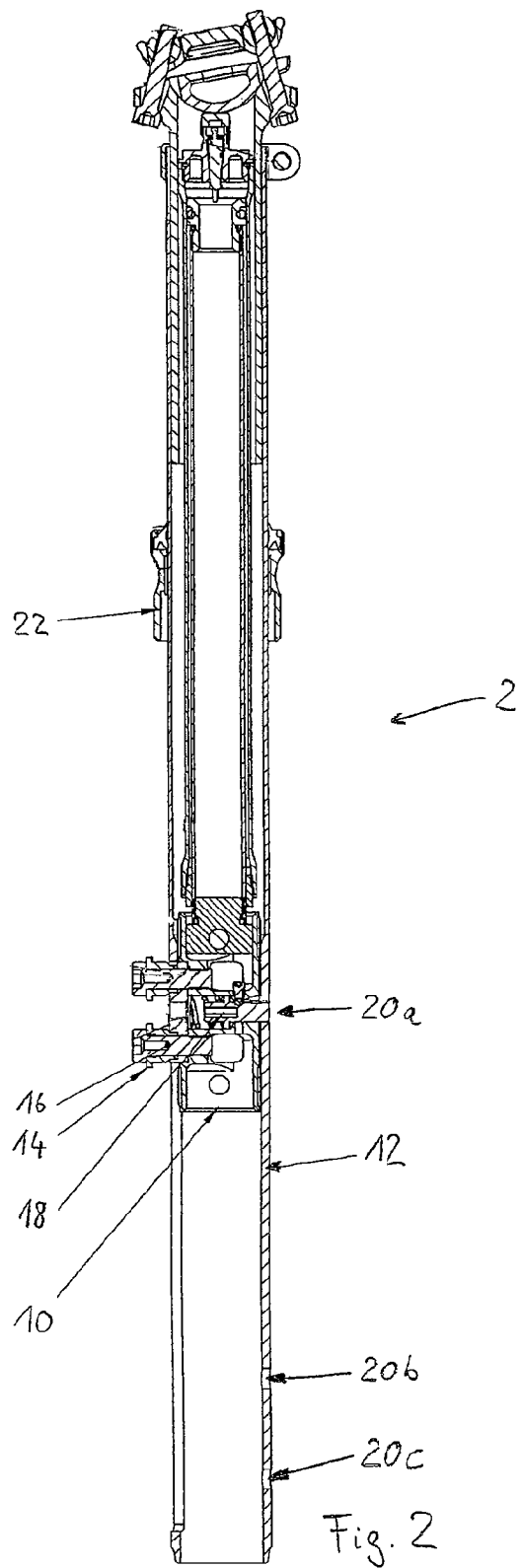
FIG. 2 shows the saddle pillar of the practical example in a lateral sectional representation.
Figure 3:
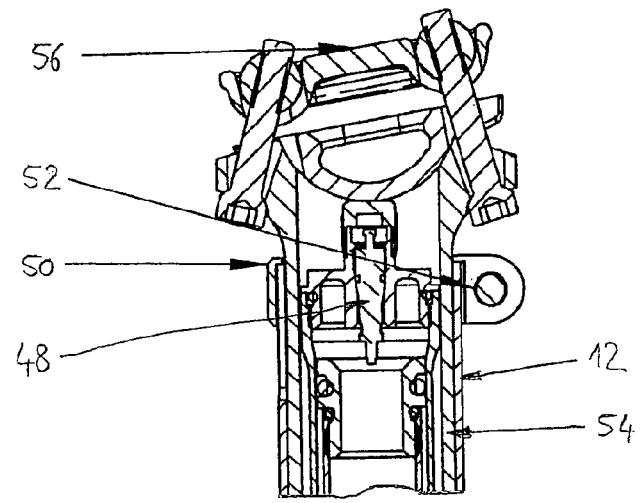
FIG. 3 shows three details of the saddle pillar of the practical example in a lateral sectional representation.
Figure 3:
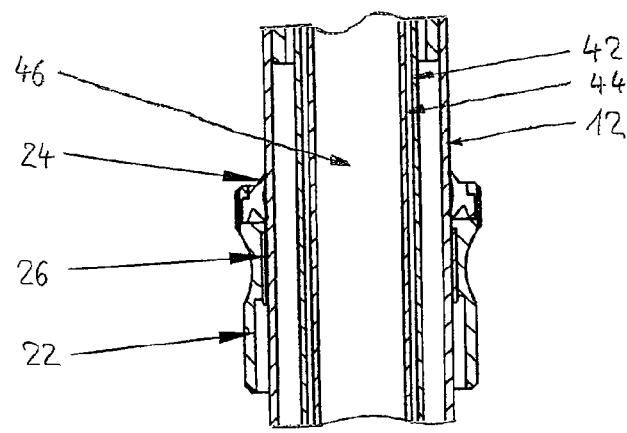
Figure 3:
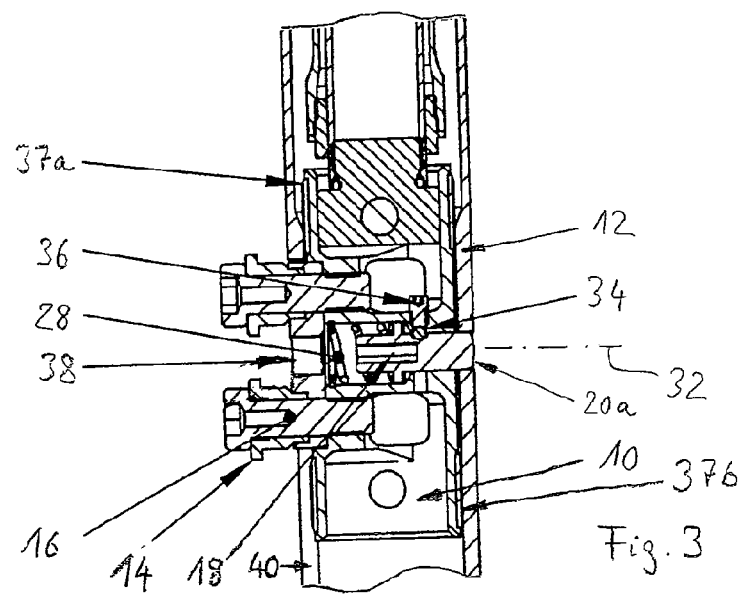

FIG. 1 shows a first practical example of a bicycle frame in accordance with the invention 1 which comprises a height-adjustable saddle pillar 2. A seat tube 4 constituting a part of the bicycle frame 1 is formed integrally with the bicycle frame 1. The saddle pillar 2 is adapted for being inserted in the seat tube 4. In the front relative to the running direction of the seat tube 4 a recess is provided which is covered by a base plate 6. In this location a fixation device 10 of the saddle pillar 2, which shall be explained in more detail with reference to FIGS. 2 and 3, is fastened in the seat tube 4 from inside via the base plate 6. In the same location of the seat tube 4 a housing 8 including a rotary device 30, which shall be explained with reference to FIG. 4, is attached from the outside. The rotary device 30 or the housing 8, respectively, are connected via a Bowden cable to an operating lever fastened to the handlebar of the bicycle frame 1 (not shown).

FIG. 2 shows the saddle pillar 2 of the first practical example in a lateral sectional representation. Here the saddle pillar 2 is represented as a mirror image of the representation in FIG. 1. The saddle pillar 2 comprises the fixation device 10 arranged substantially inside a main tube 12 of the saddle pillar 2. The fixation device 10 is fastened to the base plate 6 of the seat tube 4 by means of two outer hollow screws 14 and two screws 16 inserted into the hollow screws 14 (cf. FIG. 1).

Towards the rear relative to the running direction, a fixation pin 18 protrudes from the fixation device 10. Three holes 20a, 20b, 20c of the main tube 12 are associated to the fixation pin 18, whereby the main tube 12 may be held at three different levels relative to the fixation device 10 integral with the frame. In FIG. 2 the lowest position of the main tube 12 and thus of the entire saddle pillar 2 is represented. The fixation pin 18 may be retracted by means of the Bowden cable and the operating lever for a height adjustment of the saddle pillar 2.

At an upper front end side of the seat tube 4 (cf. FIG. 1) a guide sleeve or sealing cap 22 is fastened, relative to which the saddle pillar 2 or the main tube 12 thereof is displaceable during the height adjustment.

FIG. 3 shows three essential details of the saddle pillar 2 according to FIG. 1 in a lateral sectional representation. In a central area the sealing cap 22 integral with the frame is arranged which includes a seal 24 resting against the main tube 12 and a slide bearing 26 equally resting against the main tube 12.

In the lower area of the saddle pillar 2 shown in enlarged representation it may be seen that the fixation pin 18 is supported on the fixation device 10 via a compression spring 28. Thus the fixation pin 18 is biased to the right (in FIG. 3) against the running direction in a locking direction. From there the fixation pin 18 may be rotated along a pin axis 32 via the rotary device 30 shown in FIG. 4, a hooking device 31 coupled to the latter, and the Bowden cable. The rotary device 30 includes a reset spring 33 and the housing 8 which is fastened to the seat tube 4 of the frame via a cover plate 35 (cf. FIG. 1).

By means of a helical groove of the fixation pin 18, which is engaged by a small sphere 34 held in the fixation device 10 via a stud screw 36, the fixation pin 18 is extracted from the hole 20a against the force of the compression spring 28 by the rotating movement. Hereby it is made possible to adjust the saddle pillar to higher positions while the main tube 12 is mounted vis-à-vis the fixation device 10 via two slide bearings 37a, 37b.

It is also possible to provide a purely translatory movement of the fixation pin 18 directly via the Bowden cable without a rotary device, which is more simple in terms of device technology.

During the height adjustment a rotation prevention means takes effect which is formed by a radial projection 38 extending in the running direction from the fixation device 10 and by an oblong hole 40 of the main tube 12. The projection 38 has a width approximately corresponding to the one of the oblong hole 40, wherein the oblong hole 40 has a length at least corresponding to the maximum spacing between the holes 20a and 20c (cf. FIG. 2).

During a downward height adjustment of the saddle pillar 2, the displacement of the main tube 12 takes place particularly on account of the weight force of a rider of the bicycle, whereas an upward displacement of the saddle pillar 2 is effected by the force of an air spring. The latter comprises an outer tube 42 and an inner tube 44 which are largely superimposed in the lower position of the main tube 12 as shown in FIGS. 2 and 3. The inner tube 44 is fastened by its lower end portion to the fixation device 10 and is thus integral with the frame. The outer tube 42 is indirectly supported via its upper end portion on the upper end portion of the main tube 12 and applies a lifting force to the latter. To this end, the two pipes 42, 44 of the air spring form an air-filled pressure chamber 46, the pressure of which may be altered by the rider of the bicycle by means of a valve 48 arranged in an upper lid of the outer tube 42. This serves for an adaptation of the lifting force of the air spring to a weight of the rider.

In an inner space of the upper end portion of the main tube 12 a pipe 54 integral with the saddle is inserted and clamped there by means of a clamping ring 50 and a screw 52. By means of this optional device a standard length of the saddle pillar 2 of the invention or an adjustment range of its height may be adapted to different body sizes, particularly leg lengths, of bicycle riders.

At the upper end portion of the pipe 54 integral with the saddle a component group 56 is arranged whereby a saddle (not shown) may be fastened to the pipe 54 integral with the saddle.

In difference from the shown practical example, two or more than three holes 20a, 20b, 20c and thus locking positions for the main tube 12 of the saddle pillar 2 may also be provided.

In difference from the first practical example shown in FIG. 3, the pipe 54 integral with the saddle may also be omitted. In this case the component group 56 is fastened directly to the upper end portion of the main tube 12.

What is disclosed is a bicycle frame comprising a seat tube wherein a saddle pillar for a saddle is received at least in portions thereof, the saddle pillar or its main tube, respectively, being adapted for translatory movement and height-adjustment relative to the bicycle frame. At the seat tube a rotation prevention means and a locking device, in particular a supporting device, are fastened. Both securing means act through form-fit between the seat tube and the main tube. The engagement of the rotation prevention means in the main tube is permanent, and the engagement of the locking device is switchable.

LIST OF REFERENCE SYMBOLS 1 bicycle frame
2 saddle pillar
4; 104 seat tube
6 base plate
8 housing
10 fixation device
12; 112 main tube
14 hollow screw
16 screw
18; 118 fixation pin
20a, 20b, 20c; 120a, 120b hole
22 sealing cap
24 seal
26 slide bearing 28; 128 compression spring
30 rotary device
31 hooking device
32 pin axis
33 reset spring
34 sphere
35 cover plate
36 stud screw
37a, 37b slide bearing
38; 138 projection
40; 140 oblong hole
42 outer tube
44 inner tube
46 pressure chamber
48 valve
50 clamping ring
52 screw
54 pipe integral with the saddle
56 component group

The invention claimed is:

1. A bicycle frame comprising:
a seat tube wherein a main tube of a saddle pillar of a saddle may be inserted by at least portions thereof, wherein the main tube is adapted for translatory movement and height-adjustability relative to the seat tube;
the seat tube further comprising a form-fit rotation prevention means fastened to the seat tube;
a switchable locking device for the main tube fastened to the seat tube; wherein
the saddle pillar comprises a pipe integral with the saddle which is adapted for translatory movement and height-adjustability relative to the main tube, and which is inserted in an upper end portion of the main tube and adapted to be clamped thereto; wherein
the form-fit rotation prevention means prevents rotation of the saddle when a height of the saddle is adjusted; wherein
the form-fit rotation prevention means and the switchable locking device are combined in one fixation device by at least portions thereof; and wherein
the fixation device comprises an elastic member supported on the fixation device and applies a lifting force to the main tube.

2. A bicycle frame according to claim 1, wherein the switchable locking device comprises a fixation pin which is movable substantially transversely to a longitudinal axis of the main tube, and wherein the main tube comprises at least two radial recesses in which the fixation pin may lockingly engage.

3. A bicycle frame according to claim 2, wherein the fixation pin is acted on by a locking force of an elastic locking member in the direction toward the at least two radial recesses, and wherein the fixation pin may be moved contrary to the locking force via a remote control from a handlebar.

4. A bicycle frame according to claim 3, wherein the fixation pin may be moved via a rotary device.

5. A bicycle frame according to claim 3, wherein the fixation pin may be moved via a pulling device and a Bowden cable by an operating element of the handlebar.

6. A bicycle frame according to claim 1, wherein the form-lit rotation prevention means comprises a depression in the main tube which is directed radially inward and in which at least one sliding block integral with the frame is inserted radially from the outside.

7. A bicycle frame according to claim 1, wherein the fixation device is received in the main tube.

8. A bicycle frame according to claim 1, wherein the form-fit rotation prevention means comprises a projection which is formed on the fixation device and inserted in an oblong hole of the saddle pillar.

9. A bicycle frame according to claim 8, wherein the switchable locking device comprises a fixation pin which is movable substantially transversely to a longitudinal axis of the main tube, and wherein the main tube comprises at least two radial recesses in which the fixation pin may lockingly engage and wherein the fixation pin may be moved via a rotary device and a pulling device via a Bowden cable by an operating element of the handlebar, wherein the rotary device, the projection and the oblong hole are arranged in front relative to a running direction, and wherein the fixation pin and the at least two radial recesses are arranged in the rear relative to the running direction.

10. A bicycle frame according to claim 1, comprising an elastic member which is coupled to a projection of the form-fit rotation prevention means and applies a lifting force to the main tube.

11. A bicycle frame according to claim 1, wherein the elastic member is an air spring which is arranged inside the main tube and comprises an outer tube and an inner tube which partially overlap each other and jointly delimit a pressure chamber, wherein the inner tube is fastened to the fixation device whereas the outer tube is directly or indirectly fastened to the main tube.

12. A bicycle frame according to claim 11, wherein the air spring comprises a valve for changing the pressure in the pressure chamber.

13. A bicycle frame according to claim 1, wherein at an upper end portion of the seat tube an annular sealing cap is fastened which comprises a seal resting against the main tube and a slide bearing resting against the main tube.

14. A bicycle frame according to claim 13, wherein the form-fit rotation prevention means and the locking device are combined in one fixation device by at least portions thereof wherein at least one slide bearing is arranged between the fixation device and the main tube.

15. A method for assembling a bicycle frame, comprising the steps of
providing the bicycle frame including:
a seat tube wherein a main tube of a saddle pillar of a saddle may be inserted by at least portions thereof, the main tube being adapted for translatory movement and height-adjustable relative to the seat tube, comprising a form-fit rotation prevention means fastened to the seat tube and a switchable locking device for the main tube fastened to the seat tube, wherein
the saddle pillar comprises a pipe integral with the saddle which is adapted for translatory movement and height-adjustable relative to the main tube, and which is inserted in an upper end portion of the main tube and adapted to be clamped thereto; and
wherein the form-fit rotation prevention means prevents rotation of the saddle when a height of the saddle is adjusted; and wherein the form-fit rotation prevention means and the switchable locking device are combined in one fixation device by at least portions thereof;
inserting a fixation device in a main tube of a saddle pillar;
producing a recess at a seat tube of the bicycle frame;
inserting the main tube in the seat tube;
fastening a base plate on or in the recess from the outside; and
screw-fastening the base plate and the fixation device.

16. The method of claim 15, further comprising the steps of:
 providing an elastic member in the form of an air spring which is supported on the fixation device to apply a lifting force to the main tube; and
 arranging the elastic member inside the main tube, the elastic member comprising an outer tube and an inner tube which partially overlap each other and jointly delimit a pressure chamber.

\* \* \* \* \*